US008876995B2

(12) United States Patent
Dugand et al.

(10) Patent No.: US 8,876,995 B2
(45) Date of Patent: Nov. 4, 2014

(54) METHOD AND APPARATUS FOR JOINING PANELS CONSTITUTING COMPONENTS OF MOTOR-VEHICLE BODIES, WITH QUALITY CONTROL

(75) Inventors: Marie Marguerite Dugand, Orbassano (IT); Cosimo Carvignese, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 130 days.

(21) Appl. No.: 12/904,400

(22) Filed: Oct. 14, 2010

(65) Prior Publication Data

US 2011/0146879 A1 Jun. 23, 2011

(30) Foreign Application Priority Data

Dec. 21, 2009 (EP) .................................... 09425519

(51) Int. Cl.
*B29C 65/02* (2006.01)
*B23K 31/12* (2006.01)
*B23K 13/01* (2006.01)
*C09J 5/06* (2006.01)
*F16B 11/00* (2006.01)

(52) U.S. Cl.
CPC ................ *B23K 31/12* (2013.01); *B23K 13/01* (2013.01); *C09J 5/06* (2013.01); *B23K 2201/006* (2013.01); *B23K 2201/18* (2013.01); *C09J 2400/163* (2013.01); *F16B 11/006* (2013.01)
USPC .............................................. 156/64; 374/53

(58) Field of Classification Search
USPC .......................... 156/64, 359; 374/53; 228/103
See application file for complete search history.

(56) References Cited

U.S. PATENT DOCUMENTS

| 4,950,348 | A | * | 8/1990 | Larsen ........................ 156/275.3 |
| 6,026,881 | A | * | 2/2000 | Durso ............................ 156/359 |
| 6,265,701 | B1 | | 7/2001 | Bickel et al. |
| 2003/0232152 | A1 | * | 12/2003 | Allam et al. .................. 427/595 |
| 2006/0191622 | A1 | * | 8/2006 | Ritter et al. ..................... 156/64 |

FOREIGN PATENT DOCUMENTS

| EP | 0 401 756 | 12/1990 |
| EP | 1 785 340 | 5/2007 |
| JP | 04 099046 | 3/1992 |

OTHER PUBLICATIONS

Search Report for EP 09425519.7 dated Jun. 9, 2010.
Mexican Patent Office Action dated Jul. 19, 2013, from Mexican Patent Application No. MX/a/2010/012711.

* cited by examiner

*Primary Examiner* — George Koch
(74) *Attorney, Agent, or Firm* — Nixon & Vanderhye P.C.

(57) ABSTRACT

A substantial portion of the peripheral edges of two panels forming a component of a motor-vehicle body, in particular a front bonnet of a motor-vehicle, is joined by interposing a thermosetting adhesive. Polymerization of the adhesive is obtained by heating, without introducing the structure into an oven, by means of one or more induction heating coil, which are shaped and arranged in proximity and along the peripheral edges of the two panels. The quality of the induction heating process is controlled according to signals output by a thermographic detection camera which is positioned adjustable at a point from which it can acquire a thermographic image of the entire extension of said peripheral edges of the panels to be joined, so as to allow simultaneously controlling the temperature reached by each portion of the peripheral edges of the panels.

1 Claim, 4 Drawing Sheets

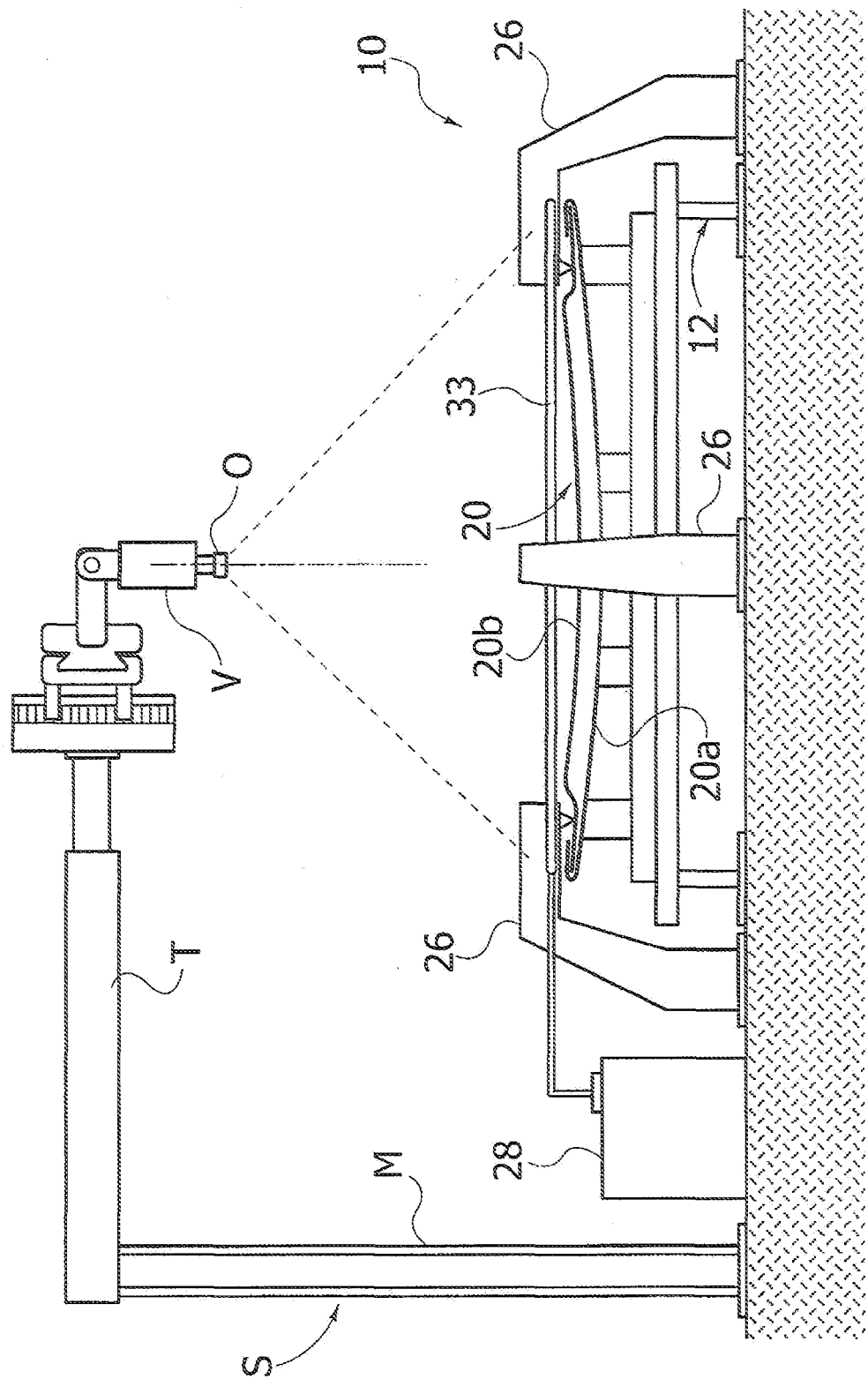

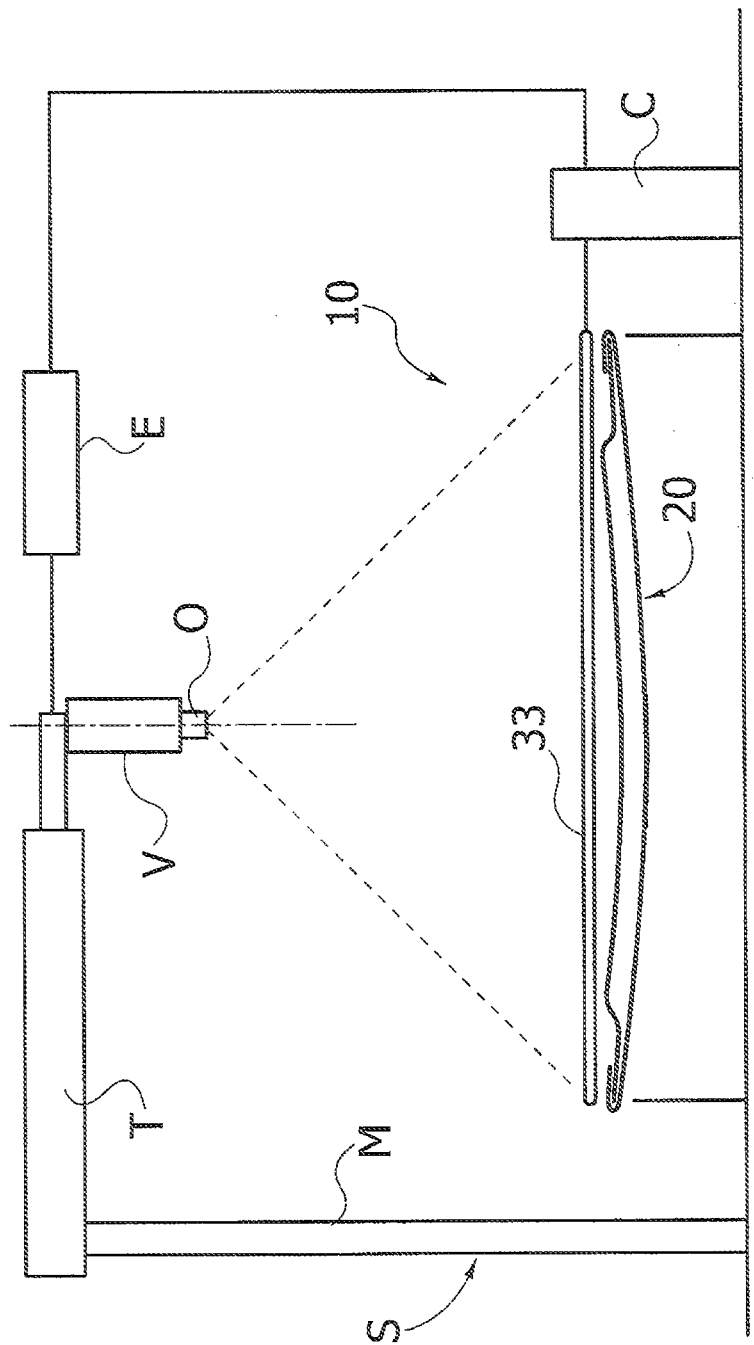

METHOD AND APPARATUS FOR JOINING PANELS CONSTITUTING COMPONENTS OF MOTOR-VEHICLE BODIES, WITH QUALITY CONTROL

BACKGROUND OF THE INVENTION

The present invention regards a method and apparatus for joining, by means of an adhesive, at least a substantial portion of the peripheral edges of the two panels constituting a component of motor-vehicle body, in particular a front bonnet of a motor, vehicle.

In particular, the invention regards a method and apparatus wherein it is provided for that a thermosetting adhesive be interposed between the peripheral and internal edges of the two panels and wherein said panels are heated along said peripheral edges to obtain the polymerization of the adhesive, the heating being carried out without the introducing the structure into an oven, by means of one or more magnetic induction coils which are shaped and arranged in proximity of and along said peripheral edges.

A method and apparatus of the type indicated above are described and illustrated in document EP 1 785 340 A2. Such known apparatus has the advantage of allowing considerable saving not only from a financial point of view but also time with respect to the more traditional methods, wherein the component made up of the two panels having the thermosetting adhesive interposed therebetween is introduced into an oven with the aim of obtaining the required polymerization of the adhesive. Though advantageous, the prior art apparatus requires a monitoring and control system capable of verifying the uniformity of the heating of the component. Therefore, if—on one hand—this solution leads to a theoretical economic and higher productivity advantage with respect to the traditional method of heating in an oven, this advantage—on the other hand—is lost in that a considerable amount of products may not meet the required quality standards, if not provided with a suitable monitoring system.

SUMMARY OF THE INVENTION

The object of the present invention is that of overcoming such drawbacks and more generally providing a method and apparatus of the type indicated above capable of guaranteeing high quality for the products obtained, bust still maintaining the advantage of high productivity, through a substantial reduction of times and costs and with the further possibility of observing an immediate advantage regarding the quality of the joining obtained, during the same production process.

With the aim of obtaining such object this invention of provides a method of the type indicated above, characterised in that a thermographic detection camera is provided at an adjustable position from which it can acquire a thermographic image of the entire extension of said peripheral edges of panels to be joined, in such a manner to simultaneously control the temperature attained by each portion of said peripheral edges during the heating and induction step.

Such thermographic detection allows controlling the parameters of the induction process, i.e. the instantaneous power provided by the coils and the temperature attained by each part of the component. Therefore, the method guarantees controlling the uniformity of the distribution of the temperatures attained by each portion of said peripheral edges.

In addition, the invention has the object of an apparatus according to the description outlined in the attached claim 3.

Due to the characteristics indicated above, the invention allows maintaining the advantages of high operative speed with respect to the more traditional methods providing for heating in an oven, additionally also without the risk of low quality of the obtained components, due to the possibility of simultaneously controlling the temperature of the component along the entire extension of its peripheral edge.

BRIEF DESCRIPTION OF THE DRAWINGS

Further characteristics and advantages of the invention shall be clear from the following description with reference to the attached drawings, strictly provided for exemplifying and non-limiting purposes, wherein:

FIG. 3 is a schematic elevational view of the apparatus of FIGS. 1, 2 modified according to the disclosures of the present invention, and FIG. 4 is a block diagram further illustrating the apparatus and the method according to the invention.

DETAILED DESCRIPTION OF THE INVENTION

Figure 1:
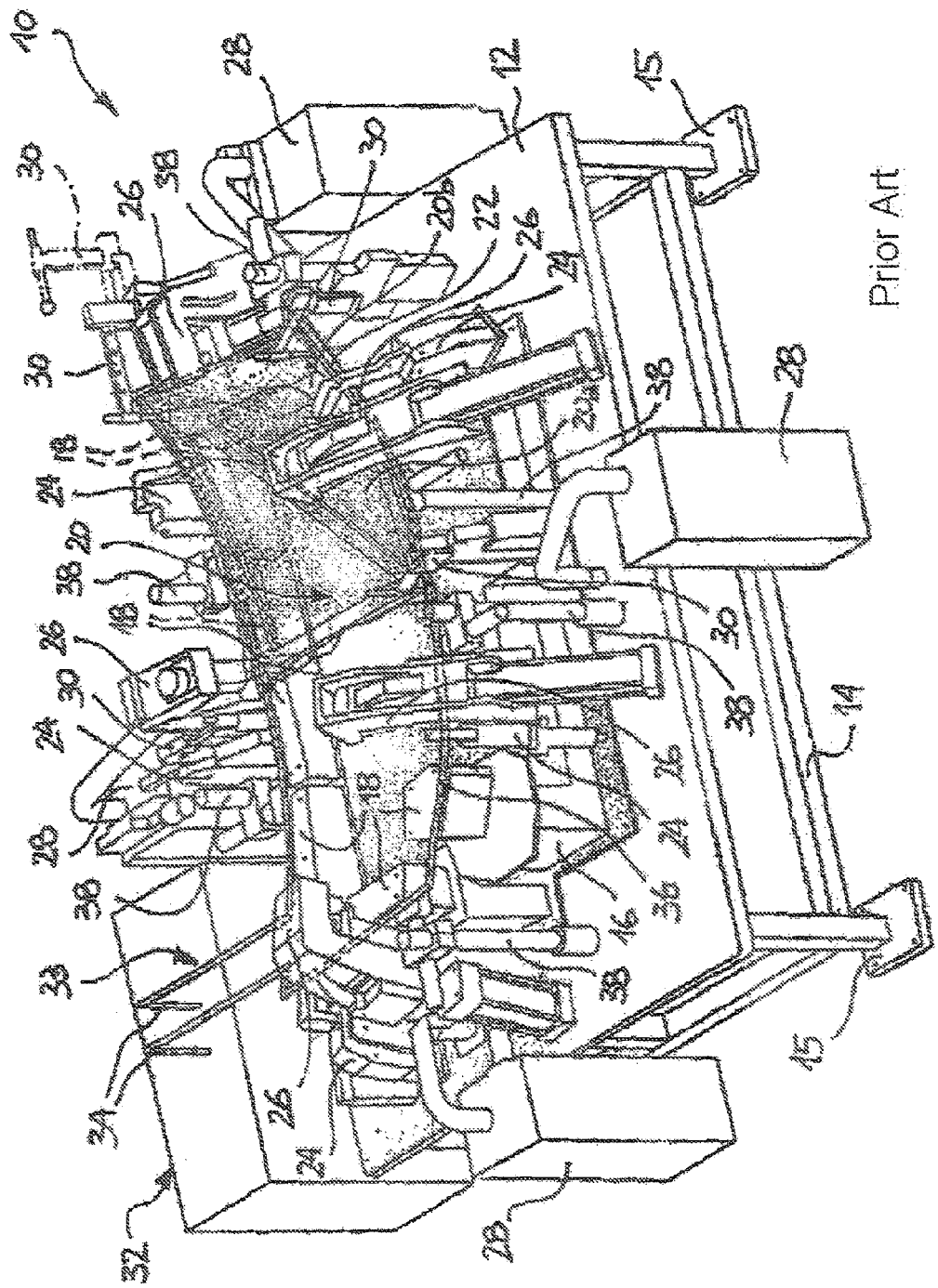
FIGS. 1, 2 are a perspective schematic view and a plan view of an apparatus according to the prior art.
Figure 2:
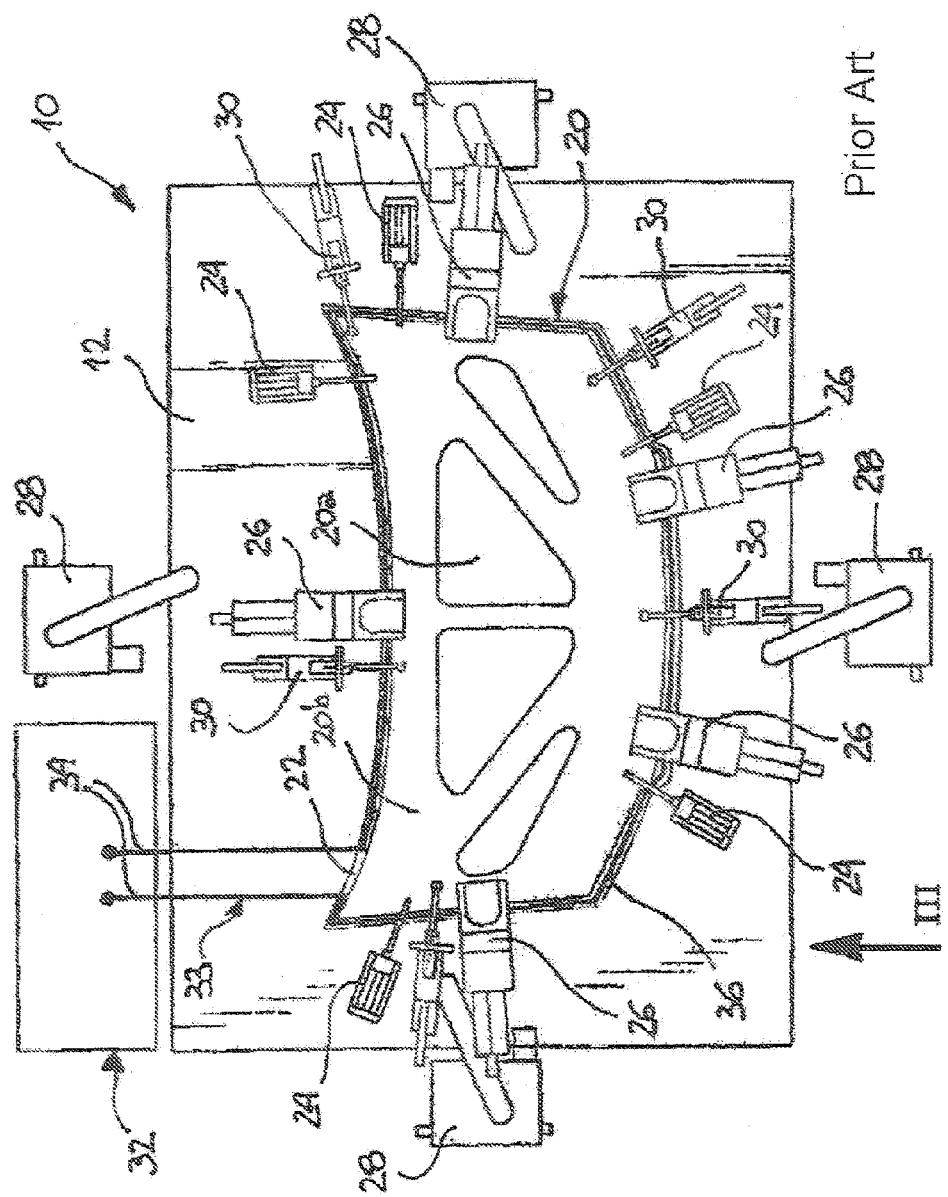

FIGS. 1, 2 are a reproduction of the same figures part of document EP 1 785 340 A2. Provided for hereinafter is a summarized description of such figures using some of the reference numbers that used therein. Reference number 10 indicates—in its entirety—a station for joining two panels 20a, 20b that are overlapped with respect to each other to obtain the front bonnet of a motor-vehicle (indicated in its entirety with 20). The structure of the two panels is illustrated solely partly and interrupted in FIG. 1, to show the underlying components more clearly. The two panels 20a, 20b are positioned in the station illustrated in FIG. 1 after being joined by hemming their peripheral edges, interposing a thermosetting adhesive—intended to be polymerised through heating—between such peripheral edges. The station 10 comprises a base structure 12 provided with a series of supports 18 borne by a framework 16 mounted on the base structure 12. The supports 18 are shaped and arranged also to represent a reference for the proper position of the structure represented by the two overlapped panels 20a, 20b. In such condition, the two panels are held at the required assembly position by means of a plurality of holding clamps 24 actuated by pneumatic actuators. To ensure complete connection of the two panels 20a, 20b, the latter are also joined by applying a plurality of electric welded spots by means, of electric welding heads 26 of any known type which are power supplied by means of electric transformers 28. Preferably, the welding heads comprise clamps having welding electrodes arranged on the same side of the structure to be welded (above it in this case) one of the two electrodes being intended to come into, contact with the panel 20b, which in the condition illustrated in FIG. 1 is at the upper position, and the other electrode being intended to come into contact with the peripheral edge of the lower panel 20a, which is turned above the upper panel 20b This type of welding is particularly recommended in applications of this type, in that it does not cause the electrodes to be engaged against the surface of the panel that forms the external surface of the front bonnet in the final condition of use. Thus, there is no risk that the pressure exerted by the electrodes during the welding may cause a deformation and an ensuing defect of the external surface of the front bonnet.

According to a per se known technique of document EP 1 785 340 A2, the polymerisation of the thermosetting adhesive—which is interposed between the peripheral edges of the two overlapped panels 20a, 20b—is obtained through heating by means of induction heating tools. This allows obtaining heating without transferring the component into an oven, i.e. maintaining it on the same welding station, and with an ensuing substantial reduction of production times. The induction heating tool is a coil 33 which is arranged in proximity and along the peripheral edge of the component 20 represented by the two overlapped panels. The coil 33 is supplied with high frequency alternating current in such a manner to generate a variable electromagnetic field which in turn generates eddy currents in the component causing heating thereof. In the example illustrated in the prior art document discussed herein, the coil 33 is made up of a pipe flowing through which is a liquid coolant.

The idea on which the present invention is based essentially consists in automatically controlling the parameters of the process for induction heating of the component. This is obtained by associating to the station 10 a camera V, for thermographic detection (see FIGS. 3 and 4), of any per se known type suitable to detect the infrared radiation emitted by the heated body. The camera V is mounted adjustable on a support structure S also of any type, which—in the illustrated example—is schematized as made up of an upright M and a crosspiece T. The camera V is supported by the structure S adjustable preferably in terms of height and angularly around one or more axes orthogonal with respect to each other. Associated thereto is an objective O. The position of the camera V and the objective O are selected in such a manner that the camera V is capable of acquiring a complete image of the entire extension of the peripheral edge of the component 20 arranged in the station 10.

As exemplified in FIG. 4, during the induction heating by actuating the inductor tool 33, the camera V is actuated to supply to an electronic control unit E signals indicating the temperature reached at every instant by each portion of the peripheral edge of the component 20. The control unit E is thus capable of automatically controlling an electronic unit C for controlling the inductor tool which generates a temperature profile (with an ascent ramp followed by a constant profile, for maintaining temperatures over a predetermined period of time) and which interrupts the heating step upon ascertaining the attainment of the quality parameters set along the entire extension of the peripheral edge of the component prearranged along which is the adhesive to be polymerized.

The idea on which the present invention is based thus essentially consists in applying a thermographic detection technique to an apparatus of the type illustrated in FIGS. 1, 2, which provides for an induction heating tool positioned in proximity and along the peripheral edge of the two panels forming a component such as a front bonnet of a motor-vehicle, so as to allow simultaneously controlling the heat level of all the portions of the abovementioned peripheral edge.

Such application allows maintaining the advantages of considerably reducing production times and costs, with respect to the more traditional methods which provide for heating in an oven, simultaneously overcoming the drawbacks observable when using apparatus of the type illustrated in EP 1 785 340 A2, due to a simultaneous and continuous control of the thermal level of all points of the peripheral edge of the component being processed.

In a concrete embodiment, the thermographic camera was an AGEMA MOD 900 SWB thermographic camera, operating in the IR range comprised between 2.8 and 5.5 wavelength microns, with a germanium objective and 40° opening.

Obviously, without prejudice to the principle of the invention, the details and embodiments may vary, even significantly, with respect to what has been described herein by way of non-limiting example: without departing from the scope of the present invention.

What is claim is:

1. Method for joining, by use of an adhesive, at least a substantial portion of the peripheral edges of two panels forming a front bonnet of a motor-vehicle body, said method comprising:
   a step of interposing a thermosetting adhesive between the peripheral edges of the two panels forming the front bonnet, and
   a step of heating said panels along said peripheral edges to obtain the polymerisation of the adhesive,
   wherein said heating is carried out, without introducing the panels into an oven, by use of one or more magnetic induction coils which are shaped and arranged in proximity of and along said peripheral edges,
   wherein a single thermographic detection camera is provided at an adjustable position from which the camera can acquire a thermographic image of the entire extension of said peripheral edges of the panels to be joined, in such a manner to simultaneously control the temperature attained by each portion of said peripheral edges during the induction heating step,
   wherein the heating step provides for a first part with increasing temperature followed by a second part with constant temperature and in that the heating is interrupted upon ascertaining, by use of said camera, attainment of quality parameters set along the entire extension of the peripheral edges along which the adhesive to be polymerized is prearranged, and
   wherein said method further comprises:
   providing a base structure on which said two panels are supported horizontally, and
   providing a support structure for said single thermographic detection camera, which holds said single thermographic detection camera in a raised position above said panels, said position being spaced apart vertically from said panels by a distance which is several times the axial dimension of said single thermographic detection camera,
   wherein the single thermographic camera is placed at a particular distance during heating of the adhesive,
   wherein the single thermographic camera is used to generate a single image which, at any instant, contains all portions of the peripheral edges of the panels to be monitored so that all portions of the peripheral edges of the panels can be monitored simultaneously,
   wherein the method is stopped when the single image shows that all monitored peripheral edges of the panels have reached a set of required characteristics, and
   wherein the single thermographic camera is not moved during the method in order to focus on all of the monitored peripheral edges of the panels.

* * * * *